United States Patent
Chang et al.

(10) Patent No.: US 10,923,119 B2
(45) Date of Patent: Feb. 16, 2021

(54) SPEECH DATA PROCESSING METHOD AND APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Xiantang Chang, Beijing (CN); Weigao Li, Beijing (CN); Sheng Qian, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 85 days.

(21) Appl. No.: 15/857,487

(22) Filed: Dec. 28, 2017

(65) Prior Publication Data

US 2019/0122662 A1   Apr. 25, 2019

(30) Foreign Application Priority Data

Oct. 25, 2017 (CN) .......................... 201711010711.7

(51) Int. Cl.
*G10L 15/22* (2006.01)
*G06F 5/08* (2006.01)
(Continued)

(52) U.S. Cl.
CPC .............. *G10L 15/22* (2013.01); *G06F 5/085* (2013.01); *G10L 15/05* (2013.01); *G10L 15/08* (2013.01);
(Continued)

(58) Field of Classification Search
CPC ... G10L 15/22; G10L 15/08; G10L 2015/088; G10L 15/05; G10L 15/32; G10L 2015/223; G06F 5/085
See application file for complete search history.

(56) References Cited

U.S. PATENT DOCUMENTS 9,691,378 B1 * 6/2017 Meyers ................... G10L 15/04
9,734,822 B1 * 8/2017 Sundaram ............... G10L 15/08
(Continued)

FOREIGN PATENT DOCUMENTS

CN     103456306 A    12/2013
CN     104321622 A    1/2015
(Continued)

OTHER PUBLICATIONS

Notice of Reasons for Refusal from JP app. No. 2018-199704, dated Nov. 12, 2019, with machine English translation.
(Continued)

*Primary Examiner* — Michelle M Koeth
(74) *Attorney, Agent, or Firm* — Ladas & Parry, LLP

(57) ABSTRACT

The present disclosure provides a speech data processing method and apparatus, a device and a storage medium, wherein the method comprises: a client obtains speech data, uses a speech wakeup engine to perform wakeup recognition for the obtained speech data, and stores the obtained speech data in a cyclic buffer queue; the client obtains a wakeup recognition result returned by the speech wakeup engine upon completion of the wakeup recognition, and if the wakeup recognition result is acknowledged wakeup and it is determined that there occurs a case of oneshot currently, determines an interception starting position and obtains buffer data in the cyclic buffer queue from the interception staring position to an end of the queue, the buffer data at least including the content to be recognized; the client sends the buffer data to a speech recognition engine so that the speech recognition engine performs speech recognition for the content to be recognized in the buffer data. The technical solution of the present disclosure can be applied to improve accuracy of the speech recognition result and the like.

24 Claims, 4 Drawing Sheets

(51) Int. Cl.
  *G10L 15/08* (2006.01)
  *G10L 15/32* (2013.01)
  *G10L 15/05* (2013.01)

(52) U.S. Cl.
  CPC ........ *G10L 15/32* (2013.01); *G10L 2015/088* (2013.01); *G10L 2015/223* (2013.01)

(56) References Cited

U.S. PATENT DOCUMENTS

| | | | |
|---|---|---|---|
| 10,304,475 B1* | 5/2019 | Wang | G10L 21/0216 |
| 2010/0135511 A1* | 6/2010 | Pontoppidan | H04R 25/505 |
| | | | 381/313 |
| 2013/0325484 A1 | 12/2013 | Chakladar et al. | |
| 2014/0302855 A1 | 10/2014 | Nory et al. | |
| 2015/0302855 A1 | 10/2015 | Kim et al. | |
| 2016/0077792 A1* | 3/2016 | Bansal | G06F 3/167 |
| | | | 704/275 |
| 2016/0125883 A1 | 5/2016 | Koya | |
| 2016/0148615 A1 | 5/2016 | Lee et al. | |
| 2017/0068513 A1 | 3/2017 | Stasior et al. | |
| 2018/0033436 A1* | 2/2018 | Zhou | G10L 15/00 |
| 2018/0174583 A1* | 6/2018 | Zhao | G10L 15/22 |
| 2020/0335103 A1* | 10/2020 | Tuli | G06F 12/0802 |

FOREIGN PATENT DOCUMENTS

| | | |
|---|---|---|
| CN | 104620314 A | 5/2015 |
| CN | 104850827 A | 8/2015 |
| CN | 105009204 A | 10/2015 |
| CN | 105340334 A | 2/2016 |
| CN | 105632491 A | 6/2016 |
| CN | 106228985 A | 12/2016 |
| CN | 106233376 A | 12/2016 |
| CN | 106448678 A | 2/2017 |
| CN | 106463112 A | 2/2017 |
| CN | 105408953 A | 3/2017 |
| CN | 106910496 A | 6/2017 |
| JP | 2015011170 A | 1/2015 |
| JP | 2016535312 A | 11/2016 |
| JP | 2017079051 A | 4/2017 |
| JP | 2017520012 A | 7/2017 |

OTHER PUBLICATIONS

First Office Action from CN app. No. 201711010711.7, dated Jun. 30, 2020, with machine English translation from Google Translate.

* cited by examiner

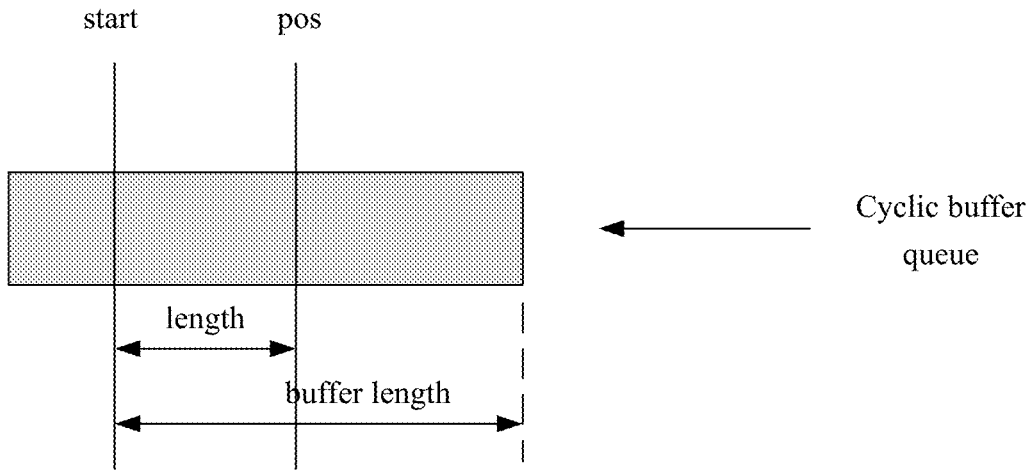

Fig. 2

```
A speech recognition engine obtains buffer data from a client, the buffer
data at least including content to be recognized, the buffer data being
buffer data which is a cyclic buffer queue from a determined interception
starting position to an end of the queue and is obtained after the client
obtains a wakeup recognition result returned by a speech wakeup engine       301
upon completion of the wakeup recognition and if the wakeup recognition
result is acknowledged wakeup and it is determined that there occurs a case
of oneshot currently, wherein the case of oneshot is a case in which
wakeup words are spoken together with the content to be recognized, and
the client obtains the speech data, uses the speech wakeup engine to
perform wakeup recognition for the obtained speech data, and stores the
obtained speech data in the cyclic buffer queue
```

```
The speech recognition engine performs speech recognition for content to    302
be recognized in the buffer data
```

Fig. 3

SPEECH DATA PROCESSING METHOD AND APPARATUS, DEVICE AND STORAGE MEDIUM

CROSS REFERENCE TO RELATED APPLICATION

The present application claims priority to Chinese Patent Application No. 2017110107117, filed on Oct. 25, 2017, with the title of "Speech data processing method and apparatus, device and storage medium", the disclosure of which is hereby incorporated herein by reference in its entirety.

The present application claims the priority of Chinese Patent Application No. 2017110107117, filed on Oct. 25, 2017, with the title of "Speech data processing method and apparatus, device and storage medium".

FIELD OF THE DISCLOSURE

The present disclosure relates to computer application technologies, and particularly to a speech data processing method and apparatus, a device and a storage medium.

BACKGROUND OF THE DISCLOSURE

A conventional smart device enabling human-machine speech interaction usually needs to perform a wakeup operation, namely, a user speaks wakeup words first to wake up the smart device, then the user speaks real content to be recognized, and thereby performs a speech recognition operation.

Specifically, a speech wakeup engine may be used to perform wakeup recognition. A scoring library is integrated in a speech wakeup engine repository. If the scoring library gives a high score to a recognition result of certain wakeup words input by the user, for example, larger than 90 points, it may be believed that wakeup is acknowledged, and correspondingly the smart device is waked up. After wakeup, a speech recognition engine may be used to perform speech recognition for the content to be recognized.

However, sometimes, the user might speak the wakeup words together with content to be recognized, namely, a case of oneshot appears.

In a known manner, data of the speech wakeup engine and the speech recognition engine are completely isolated, that is to say, speech data sent to the speech wakeup engine are no longer sent to the speech recognition engine.

As such, this might cause a case in which the content to be recognized is partially intercepted. For example, the wakeup words are "Xiaodu Xiaodu", and content to be recognized is "stop playing the song". In the case of oneshot, a result recognized by the speech recognition engine might be "playing the song", which is incompliant with the content that the user really intends to convey.

This is because when the case of oneshot appears, partial content in the content to be recognized might be sent into the speech wakeup engine for wakeup recognition, and not sent to the speech recognition engine.

In practical application, the speech data uttered by the user are usually sent in the form of blocks (packs), for example, the speech data are "Xiaodu Xiaodu stop playing the song", wherein "Xiaodu", "Xiaodu", "stop", "playing" and the like may respectively correspond to a data block. When the speech wakeup engine performs wakeup recognition for "Xiaodu" "Xiaodu", since wakeup recognition needs a certain time period, "stop" might also be sent in this time period. As such, when the wakeup recognition is finished and the wakeup recognition result is determined as acknowledged wakeup, subsequent data blocks such as "playing" are sent to the speech recognition engine so that "stop" which originally belongs to content to be recognized is wrongly sent to the speech wakeup engine such that the speech recognition result in the speech recognition engine is wrong, i.e., accuracy of the speech recognition result is reduced.

SUMMARY OF THE DISCLOSURE

In view of the above, the present disclosure provides a speech data processing method and apparatus, a device and a storage medium, which can improve accuracy of a speech recognition result.

Specific technical solutions are as follows:

A speech data processing method, comprising:

a client obtains speech data, uses a speech wakeup engine to perform wakeup recognition for the obtained speech data, and stores the obtained speech data in a cyclic buffer queue;

the client obtains a wakeup recognition result returned by the speech wakeup engine upon completion of the wakeup recognition, and if the wakeup recognition result is acknowledged wakeup, and it is determined that currently there occurs a case of oneshot which is a case in which wakeup words are spoken together with content to be recognized, determines an interception starting position and obtains buffer data in the cyclic buffer queue from the interception staring position to an end of the queue, the buffer data at least including the content to be recognized;

the client sends the buffer data to a speech recognition engine so that the speech recognition engine performs speech recognition for the content to be recognized in the buffer data.

According to a preferred embodiment of the present disclosure, the method further comprises:

the client obtains a finishing position of the wakeup words returned by the speech wakeup engine upon completion of wakeup recognition in the speech data and length information of the wakeup words;

the determining the interception starting position comprises:

determining a starting position of the wakeup words in the speech data according to the finishing position of the wakeup words in the speech data and the length information of the wakeup words, and considering the starting position of the wakeup words in the speech data as the interception starting position.

According to a preferred embodiment of the present disclosure, the method further comprises:

the client obtains the wakeup words returned by the speech wakeup engine upon completion of wakeup recognition;

the client sends the buffer data to the speech recognition engine, and additionally sends the wakeup words to the speech recognition engine so that the speech recognition engine filters the buffer data to obtain the content to be recognized according to the wakeup words.

According to a preferred embodiment of the present disclosure, the method further comprises:

if the wakeup recognition result is suspicious wakeup and it is determined that there occurs a case of non-oneshot currently, the client sends the buffer data in the cyclic buffer queue from the interception starting position to an end of the queue to the speech recognition engine, so that the speech recognition engine performs secondary wakeup recognition according to the buffer data and returns a secondary wakeup recognition result, and if the secondary wakeup recognition result is acknowledged wakeup, determines that a final wakeup recognition result is acknowledged wakeup.

According to a preferred embodiment of the present disclosure, the method further comprises:

if the wakeup recognition result is suspicious wakeup and it is determined that there occurs a case of oneshot currently, the client sends the buffer data in the cyclic buffer queue from the interception starting position to the end of the queue to the speech recognition engine, so that the speech recognition engine performs secondary wakeup recognition according to the buffer data and returns a secondary wakeup recognition result, and if the secondary wakeup recognition result is acknowledged wakeup, determines that a final wakeup recognition result is acknowledged wakeup, the speech recognition engine performing speech recognition for content to be recognized in the buffer data.

A speech data processing method, comprising:

a speech recognition engine obtains buffer data from a client, the buffer data at least including content to be recognized, the buffer data being buffer data which is a cyclic buffer queue from a determined interception starting position to an end of the queue and is obtained after the client obtains a wakeup recognition result returned by a speech wakeup engine upon completion of the wakeup recognition and if the wakeup recognition result is acknowledged wakeup and it is determined that there occurs a case of oneshot currently, wherein the case of oneshot is a case in which wakeup words are spoken together with the content to be recognized, and the client obtains the speech data, uses the speech wakeup engine to perform wakeup recognition for the obtained speech data, and stores the obtained speech data in the cyclic buffer queue;

the speech recognition engine performs speech recognition for content to be recognized in the buffer data.

According to a preferred embodiment of the present disclosure, the interception starting position includes a starting position of the wakeup words in the speech data.

According to a preferred embodiment of the present disclosure, the method further comprises:

if the wakeup recognition result is suspicious wakeup and there occurs a case of non-oneshot currently, the speech recognition engine performs secondary wakeup recognition according to the buffer data which is from the client and in the cyclic buffer queue from the interception starting position to the end of the queue, and returns a secondary wakeup recognition result to the client, and if the secondary wakeup recognition result is acknowledged wakeup, determines that a final wakeup recognition result is acknowledged wakeup.

According to a preferred embodiment of the present disclosure, the method further comprises:

if the wakeup recognition result is suspicious wakeup and there occurs a case of oneshot currently, the speech recognition engine performs secondary wakeup recognition according to the buffer data which is from the client and in the cyclic buffer queue from the interception starting position to the end of the queue, and returns a secondary wakeup recognition result to the client, and if the secondary wakeup recognition result is acknowledged wakeup, determines that a final wakeup recognition result is acknowledged wakeup, and the speech recognition engine performs speech recognition for content to be recognized in the buffer data.

A speech data processing apparatus, comprising a first processing unit and a second processing unit;

the first processing unit is configured to obtain speech data, use a speech wakeup engine to perform wakeup recognition for the obtained speech data, and store the obtained speech data in a cyclic buffer queue;

the second processing unit is configured to obtain a wakeup recognition result returned by the speech wakeup engine upon completion of the wakeup recognition, and, if the wakeup recognition result is acknowledged wakeup and it is determined that currently there occurs a case of oneshot which is a case in which wakeup words are spoken together with content to be recognized, to determine an interception starting position and obtain buffer data in the cyclic buffer queue from the interception staring position to an end of the queue, the buffer data at least including the content to be recognized, and to send the buffer data to a speech recognition engine so that the speech recognition engine performs speech recognition for the content to be recognized in the buffer data.

According to a preferred embodiment of the present disclosure, the second processing unit is further configured to obtain a finishing position of wakeup words returned by the speech wakeup engine upon completion of wakeup recognition in the speech data and length information of the wakeup words;

determine a starting position of the wakeup words in the speech data according to the finishing position of the wakeup words in the speech data and the length information of the wakeup words, and consider the starting position of the wakeup words in the speech data as the interception starting position.

According to a preferred embodiment of the present disclosure, the second processing unit is further configured to obtain the wakeup words returned by the speech wakeup engine upon completion of wakeup recognition;

send the wakeup words to the speech recognition engine so that the speech recognition engine filters the buffer data to obtain the content to be recognized according to the wakeup words.

According to a preferred embodiment of the present disclosure, the second processing unit is further configured to if the wakeup recognition result is suspicious wakeup and it is determined that there occurs a case of non-oneshot currently, send the buffer data in the cyclic buffer queue from the interception starting position to an end of the queue to the speech recognition engine, so that the speech recognition engine performs secondary wakeup recognition according to the buffer data and returns a secondary wakeup recognition result, and if the secondary wakeup recognition result is acknowledged wakeup, determine that a final wakeup recognition result is acknowledged wakeup.

According to a preferred embodiment of the present disclosure, the second processing unit is further configured to if the wakeup recognition result is suspicious wakeup and it is determined that there occurs a case of oneshot currently, send the buffer data in the cyclic buffer queue from the interception starting position to the end of the queue to the speech recognition engine, so that the speech recognition engine performs secondary wakeup recognition according to the buffer data and returns a secondary wakeup recognition result, and if the secondary wakeup recognition result is acknowledged wakeup, determine that a final wakeup recognition result is acknowledged wakeup, the speech recognition engine performing speech recognition for content to be recognized in the buffer data.

A speech data processing apparatus, comprising a third processing unit and a fourth processing unit;

the third processing unit is configured to obtain buffer data from a client, the buffer data at least including content to be recognized, the buffer data being buffer data which is a cyclic buffer queue from a determined interception starting position to an end of the queue and is obtained after the client obtains a wakeup recognition result returned by a speech wakeup engine upon completion of the wakeup recognition and if the wakeup recognition result is acknowledged wakeup and it is determined that there occurs a case of oneshot currently, wherein the case of oneshot is a case in which wakeup words are spoken together with the content to be recognized, the client obtaining the speech data, using the speech wakeup engine to perform wakeup recognition for the obtained speech data, and storing the obtained speech data in the cyclic buffer queue;

the fourth processing unit is configured to perform speech recognition for content to be recognized in the buffer data.

According to a preferred embodiment of the present disclosure, the interception starting position includes a starting position of the wakeup words in the speech data.

According to a preferred embodiment of the present disclosure, the third processing unit is further configured to obtain the buffer data which is from the client and in the cyclic buffer queue from the interception starting position to the end of the queue when the wakeup recognition result is suspicious wakeup and there occurs a case of non-oneshot currently;

the fourth processing unit is further configured to perform secondary wakeup recognition according to the buffer data and return a secondary wakeup recognition result to the client, and if the secondary wakeup recognition result is acknowledged wakeup, determine that a final wakeup recognition result is acknowledged wakeup.

According to a preferred embodiment of the present disclosure, the third processing unit is further configured to obtain the buffer data which is from the client and in the cyclic buffer queue from the interception starting position to the end of the queue when the wakeup recognition result is suspicious wakeup and there occurs a case of oneshot currently;

the fourth processing unit is further configured to perform secondary wakeup recognition according to the buffer data and return a secondary wakeup recognition result to the client, and if the secondary wakeup recognition result is acknowledged wakeup, determine that a final wakeup recognition result is acknowledged wakeup, and perform speech recognition for content to be recognized in the buffer data.

A computer device, comprising a memory, a processor and a computer program stored on the memory and being runnable on the processor, the processor implementing the above methods upon executing the above program.

A computer-readable storage medium on which a computer program is stored, the program, when executed by a processor, implementing the above methods.

As can be seen from the above introduction, according to the solutions of the present disclosure, the client obtains speech data, uses a speech wakeup engine to perform wakeup recognition for the obtained speech data, and stores the obtained speech data in a cyclic buffer queue. Then, the client obtains a wakeup recognition result returned by the speech wakeup engine upon completion of the wakeup recognition, and if the wakeup recognition result is acknowledged wakeup and it is determined that there occurs the case of oneshot, further determines the interception starting position and obtains buffer data in the cyclic buffer queue from the interception staring position to an end of the queue, and then the client sends the buffer data to the speech recognition engine so that the speech recognition engine performs speech recognition for the content to be recognized in the buffer data. As compared with the prior art, the solutions of the present disclosure avoids a case in which the content to be recognized is partially intercepted, and thereby improves accuracy of the speech recognition result.

BRIEF DESCRIPTION OF DRAWINGS

FIG. 2 is a schematic diagram of buffer data according to the present disclosure.

FIG. 3 is a flow chart of a second embodiment of a speech data processing method according to the present disclosure.

DETAILED DESCRIPTION OF PREFERRED EMBODIMENTS

Technical solutions of the present disclosure will be described in more detail in conjunction with figures and embodiments to make technical solutions of the present disclosure clear and more apparent.

It should be appreciated that embodiments described here are only partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
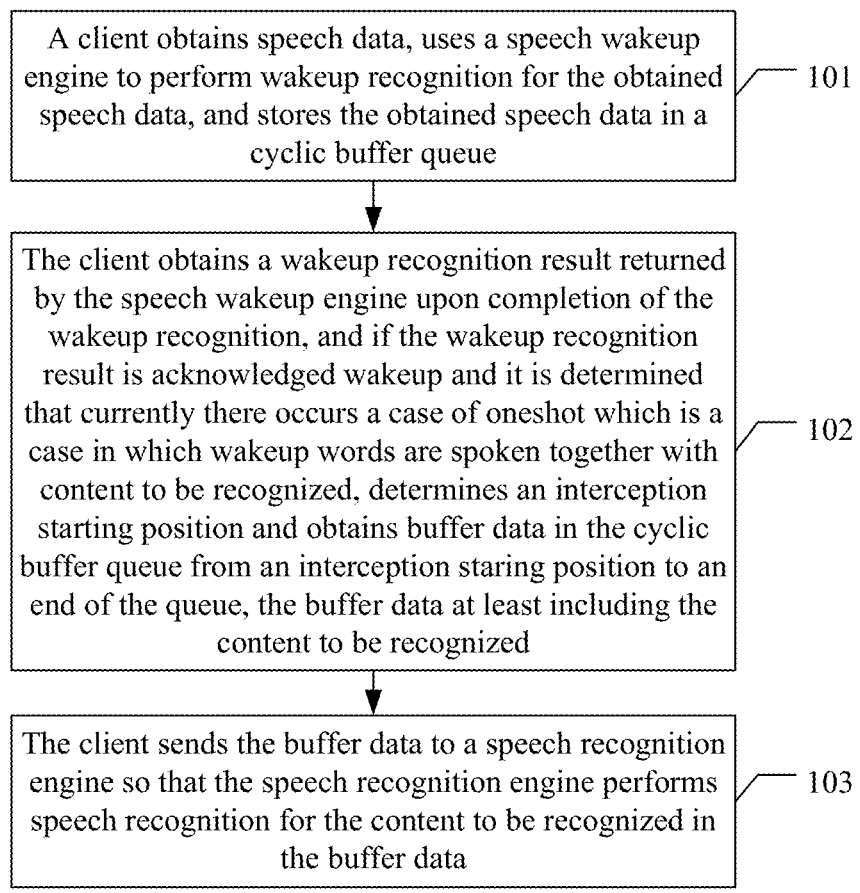
FIG. 1 is a flow chart of a first embodiment of a speech data processing method according to the present disclosure.

FIG. 1 is a flow chart of a first embodiment of a speech data processing method according to the present disclosure. FIG. 1 shows the following specific implementation mode:

In 101, a client obtains speech data, uses a speech wakeup engine to perform wakeup recognition for the obtained speech data, and stores the obtained speech data in a cyclic buffer queue.

In 102, the client obtains a wakeup recognition result returned by the speech wakeup engine upon completion of the wakeup recognition, and if the wakeup recognition result is acknowledged wakeup and it is determined that currently there occurs the case of oneshot which is a case in which wakeup words are spoken together with content to be recognized, determines an interception starting position and obtains buffer data in the cyclic buffer queue from the interception staring position to an end of the queue, the buffer data at least including the content to be recognized.

In 103, the client sends the buffer data to a speech recognition engine so that the speech recognition engine performs speech recognition for the content to be recognized in the buffer data.

The client obtains speech data from the user, and sends the speech data to the speech wakeup engine in the form of data blocks and in a known processing manner for wakeup recognition, and unlike the prior art, needs to store the speech data in the cyclic buffer queue.

The cyclic buffer queue may buffer speech data of a predetermined time length. A specific value of the predetermined time length may be set according to actual needs, for example, 6 s or 8 s.

The size of each data block may also be determined according to actual needs, for example, 320 bytes, and an index may be set for each data block, starting from 0, and increasing by 1 in turn.

After completing the wakeup recognition, the speech wakeup engine returns a wakeup recognition result, including acknowledged wakeup.

As stated above, the speech wakeup engine may be used to perform wakeup recognition. A scoring library is integrated in a speech wakeup engine repository. If the scoring library gives a high score to a recognition result of certain wakeup words input by the user, for example, larger than 90 points, it may be believed that wakeup is acknowledged.

In the present embodiment, to reduce a probability of occurrence of erroneous wakeup, namely, to improve accuracy of speech wakeup, a judging threshold may be raised, for example, if the score is larger than 95 points, the wakeup recognition result is believed to be acknowledged wakeup; if the score is lower than or equal to 95 points, the wakeup recognition result is not believed as acknowledgment of wakeup.

In addition to the wakeup recognition result, the speech wakeup engine may further return a finishing position (pos) of the wakeup words in the speech data and length information of the wakeup words, so that the client may determine a starting position (start) of the wakeup words in the speech data according to the pos and the length information, and thereby consider the start as the interception starting position.

The pos may refer to a serial number of the last data block wherein the wakeup words (e.g., "Xiaodu Xiaodu") lie, the length may represent a byte stream length of the wakeup words, and both the pos and the length may be of int type.

The client may obtain the buffer data in the cyclic buffer queue from the interception starting position to the end of the queue, and send the buffer data to the speech recognition engine so that the speech recognition engine performs speech recognition for the content to be recognized in the buffer data, wherein the client may send the buffer data to the speech recognition engine in a manner of data blocks.

FIG. 2 is a schematic diagram of the buffer data according to the present disclosure. As shown in FIG. 2, it is feasible to determine the start according to the pos and the length, and thereby consider the speech data from the start to the end of the queue as desired buffer data, and the size of the data is equal to the buffer length shown in FIG. 2.

After completing the wakeup recognition, the speech recognition engine may further return the wakeup words in addition to the wakeup recognition result, the pos and the length information. As such, the client, in addition to sending the buffer data to the speech recognition engine, may further send the wakeup words to the speech recognition engine so that the speech recognition engine filters the buffer data to obtain content to be recognized according to the wakeup words, and then performs speech recognition for the content to be recognized.

In the above embodiment, illustration is presented with an example in which the wakeup recognition result is acknowledgment of wakeup and there occurs the case of oneshot currently. In practical application, besides the acknowledged wakeup, the wakeup recognition result may further comprise suspicious wakeup. For example, when the score is larger than 95 points, it may be believed that the wakeup recognition result is acknowledged wakeup; when the score is larger than 60 points and smaller than or equal to 95 points, it may be believed that the wakeup recognition result is suspicious wakeup. In a conventional processing manner, suspicious wake is not believed as real speech wakeup so that the smart device is not awakened. However, in fact, the suspicious wakeup might be real speech wakeup, so that a success rate of speech wakeup is reduced.

In this regard, it is proposed in the present disclosure that as for suspicious wakeup situation, the client may send the speech data to the speech recognition engine for secondary wakeup recognition; after the speech recognition engine performs secondary wakeup recognition, if the wakeup recognition result is acknowledged wakeup, it may be believed that a final wakeup recognition result is acknowledged wakeup, and correspondingly, the smart device is awakened, otherwise the smart device is not awakened.

As such, four scenarios may be obtained by considering whether the wakeup recognition result of the speech wakeup engine is acknowledged wakeup or suspicious wakeup, and whether there occurs the case of oneshot or the case of non-oneshot currently: respectively, a scenario in which the wakeup recognition result is acknowledged wakeup and there occurs the case of oneshot currently, a scenario in which the wakeup recognition result is acknowledged wakeup and there occurs the case of non-oneshot currently, a scenario in which the wakeup recognition result is suspicious wakeup and there occurs the case of oneshot currently, and a scenario in which the wakeup recognition result is suspicious wakeup and there occurs the case of non-oneshot currently.

Regarding the scenario in which the wakeup recognition result is acknowledged wakeup and there occurs the case of oneshot currently, the embodiment shown in FIG. 1 has already illustrated a corresponding processing manner. The processing manners of other three scenarios will be respectively illustrated below.

1) The scenario in which the wakeup recognition result is acknowledged wakeup and there occurs the case of non-oneshot currently The processing manner in this scenario is identical with the prior art. The user speaks out the wakeup words, the speech wakeup engine returns the wakeup recognition result of acknowledged wakeup, the smart device is awakened, subsequently waits for the user to speak out the content to be recognized, and performs speech recognition for the content to be recognized.

2) The scenario in which the wakeup recognition result is suspicious wakeup and there occurs the case of oneshot currently In this scenario, the client obtains the wakeup recognition result of suspicious wakeup returned by the speech wakeup engine, and may send the buffer data to the speech recognition engine after confirming that there occurs the case of non-oneshot currently, so that the speech recognition engine performs secondary wakeup recognition according to the buffer data and returns a wakeup recognition result; if the wakeup recognition result is acknowledged wakeup, it is determined that the final wakeup recognition result is acknowledged wakeup.

As stated above, it is feasible to consider the speech data in the cyclic buffer queue from the start to the end of the queue as desired buffer data. In the case of non-oneshot, the buffer data will not include content to be recognized, and the speech recognition engine may perform secondary wakeup recognition after obtaining the buffer data, and returns the secondary wakeup recognition result. If the secondary wakeup recognition result is acknowledged wakeup, it is determined that the final wakeup recognition result is acknowledge wakeup.

3) The scenario in which the wakeup recognition result is suspicious wakeup and there occurs the case of non-oneshot currently.

In this scenario, the client obtains the wakeup recognition result of suspicious wakeup returned by the speech wakeup engine, and may send the buffer data to the speech recognition engine after confirming that there occurs the case of oneshot currently, so that the speech recognition engine performs secondary wakeup recognition according to the buffer data and returns a secondary wakeup recognition result; if the secondary wakeup recognition result is acknowledged wakeup, it is determined that the final wakeup recognition result is acknowledged wakeup, and the speech recognition engine performs speech recognition for the content to be recognized in the buffer data.

As compared with the scenario 2), in scenario 3), after the final wakeup recognition result is determined as acknowledged wakeup, the speech recognition engine performs speech recognition for the content to be recognized in the buffer data.

In scenario 2) and scenario 3), the client sends the buffer data to the speech recognition engine, and may additionally send the wakeup words returned by the speech wakeup engine to the speech recognition engine. The speech recognition engine may further determine the final wakeup recognition result in conjunction with the obtained wakeup words, for example, compare whether the recognized wakeup words are consistent with the obtained wakeup words.

The solution of the present disclosure is described above mainly from the side of the client. The solution of the present disclosure will be further described from the side of speech recognition engine.

FIG. 3 is a flow chart of a second embodiment of the speech data processing method according to the present disclosure. FIG. 3 shows the following specific implementation mode.

In 301, the speech recognition engine obtains the buffer data from the client, the buffer data at least includes content to be recognized, the buffer data is buffer data which is in the cyclic buffer queue from the determined interception starting position to the end of the queue and is obtained after the client obtains the wakeup recognition result returned by the speech wakeup engine upon completion of the wakeup recognition and if the wakeup recognition result is acknowledged wakeup and it is determined that there occurs the case of oneshot currently, wherein the case of oneshot is a case in which the wakeup words are spoken together with the content to be recognized. The client obtains the speech data, uses the speech wakeup engine to perform wakeup recognition for the obtained speech data, and stores the obtained speech data in the cyclic buffer queue.

The client obtains the speech data from the user, and sends the speech data to the speech wakeup engine in the form of data blocks for wakeup recognition, and additionally, needs to store the speech data in the cyclic buffer queue.

After completing the wakeup recognition, the speech wakeup engine returns the wakeup recognition result, for example, acknowledged wakeup or suspicious wakeup.

While returning the wakeup recognition result, the speech wakeup engine may further return a finishing position (pos) of the wakeup words in the speech data, length information of the wakeup words, the wakeup words and the like.

The client may determine a starting position (start) of the wakeup words in the speech data according to the pos and the length information, and thereby consider the start as the interception starting position. Then, the client may obtain the buffer data in the cyclic buffer queue from the interception starting position to the end of the queue, and send the buffer data to the speech recognition engine.

Wherein the client may send the buffer data to the speech recognition engine in the manner of data blocks. In addition, the client may further send the wakeup words to the speech recognition engine.

In 302, the speech recognition engine performs speech recognition for content to be recognized in the buffer data.

After obtaining the buffer data and the wakeup words, the speech recognition engine filters the buffer data to obtain content to be recognized, thereby performing speech recognition for the content to be recognized. The subsequent manner of processing the speech recognition result is identical with the prior art.

In the above embodiment, illustration is presented by taking an example in which the wakeup recognition result is acknowledged wakeup and there occurs the case of oneshot currently. As for other scenarios, for example, the scenario in which the wakeup recognition result is acknowledged wakeup and there occurs the case of non-oneshot currently, the scenario in which the wakeup recognition result is suspicious wakeup and there occurs the case of oneshot currently, and the scenario in which the wakeup recognition result is suspicious wakeup and there occurs the case of non-oneshot currently, specific processing manners are respectively introduced below.

Regarding the scenario in which the wakeup recognition result is acknowledged wakeup and there occurs the case of non-oneshot currently, since the speech data does not include content to be recognized and the secondary wakeup recognition is also unnecessary, the speech recognition engine needn't perform any processing for the obtained speech data, and it subsequently waits to obtain the content to be recognized, and then performs speech recognition for content to be recognized.

Regarding the scenario in which the wakeup recognition result is suspicious wakeup and there occurs the case of non-oneshot currently, the speech recognition engine may perform secondary wakeup recognition according to the buffer data and return the secondary wakeup recognition result to the client. If the secondary wakeup recognition result is acknowledged wakeup, it may be determined that the final wakeup recognition result is acknowledged wakeup.

The speech data in the cyclic buffer queue from the start to the end of the queue may be considered as desired buffer data. The client may send the buffer data to the speech recognition engine in the manner of data blocks. In the case of non-oneshot, the buffer data will not include content to be recognized, and the speech recognition engine may perform secondary wakeup recognition after obtaining the buffer data, and return the secondary wakeup recognition result. If the secondary wakeup recognition result is acknowledged wakeup, it is determined that the final wakeup recognition result is acknowledge wakeup. The speech recognition engine may perform the wakeup recognition in a manner similar to the speech wakeup engine.

Regarding the scenario in which the wakeup recognition result is suspicious wakeup and there occurs the case of oneshot currently, the speech recognition engine may perform secondary wakeup recognition according to the buffer data and return the secondary wakeup recognition result to the client. If the secondary wakeup recognition result is acknowledged wakeup, it may be determined that the final wakeup recognition result is acknowledged wakeup. Furthermore, the speech recognition engine may further perform speech recognition for the content to be recognized in the buffer data.

As compared with the scenario in which the wakeup recognition result is suspicious wakeup and there occurs the case of non-oneshot currently, in the scenario in which the wakeup recognition result is suspicious wakeup and there occurs the case of oneshot currently, after it is determined that the final wakeup recognition result is acknowledged wakeup, the speech recognition engine further needs to perform speech recognition for the content to be recognized in the buffer data.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

In one word, according to the solutions stated in the above method embodiments, the cyclic buffer queue may be arranged to send the buffer data including complete content to be recognized to the speech recognition engine, thereby avoiding a case in the prior art that the content to be recognized is partially intercepted, and thereby improving accuracy of the speech recognition result.

Furthermore, according to the solutions stated in the above method embodiments, as for suspicious wakeup, the secondary wakeup recognition operation may be performed to try to avoid leakage of real speech wakeup, thereby improving the success rate and accuracy of the speech wakeup.

The above introduces the method embodiments. The solutions of the present disclosure will be further described below through an apparatus embodiment.

Figure 4:
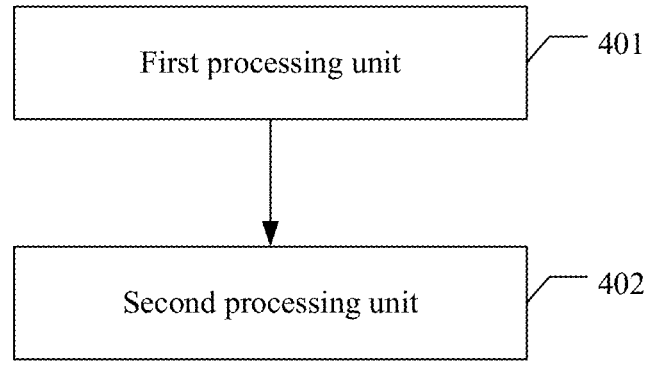
FIG. 4 is a structural schematic diagram of a first embodiment of a speech data processing apparatus according to the present disclosure.

FIG. 4 is a structural schematic diagram of a first embodiment of a speech data processing apparatus according to the present disclosure. As shown in FIG. 4, the speech data processing apparatus comprises a first processing unit 401 and a second processing unit 402.

The first processing unit 401 is configured to obtain speech data, use a speech wakeup engine to perform wakeup recognition for the obtained speech data, and store the obtained speech data in a cyclic buffer queue.

The second processing unit 402 is configured to obtain a wakeup recognition result returned by the speech wakeup engine upon completion of the wakeup recognition, and, if the wakeup recognition result is acknowledgment of wakeup and it is determined that currently there occurs the case of oneshot which is a case in which wakeup words are spoken together with content to be recognized, to determine an interception starting position and obtain buffer data in the cyclic buffer queue from the interception staring position to an end of the queue, the buffer data at least including the content to be recognized, and to send the buffer data to a speech recognition engine so that the speech recognition engine performs speech recognition for the content to be recognized in the buffer data.

The first processing unit 401 is configured to obtain the speech data from the user, send the speech data to the speech wakeup engine in the form of data blocks for wakeup recognition, and additionally, need to store the speech data in the cyclic buffer queue.

After completing the wakeup recognition, the speech wakeup engine returns the wakeup recognition result, including acknowledged wakeup. In addition, the speech wakeup engine may further return a finishing position (pos) of the wakeup words in the speech data, length information of the wakeup words, the wakeup words and the like.

The second processing unit 402 is configured to, after obtaining the pos and the length information, determine a starting position (start) of the wakeup words in the speech data according to the pos and the length information, and thereby consider the start as the interception starting position. Then, the second processing unit 402 is configured to obtain the buffer data in the cyclic buffer queue from the interception starting position to the end of the queue, and send the buffer data to the speech recognition engine so that the speech recognition engine performs speech recognition for the content to be recognized in the buffer data. The buffer data may be sent to the speech recognition engine in the manner of data blocks.

In addition, the second processing unit 402 is further configured to send wakeup words returned by the speck wakeup engine upon completion of the wakeup recognition to the speech recognition engine so that the speech recognition engine filters the buffer data to obtain content to be recognized according to the wakeup words, and then performs speech recognition for the content to be recognized.

If the wakeup recognition result is suspicious wakeup and it is determined that there occurs a case of non-oneshot currently, the second processing unit 402 is configured to send the buffer data in the cyclic buffer queue from the interception starting position to the end of the queue to the speech recognition engine, so that the speech recognition engine performs secondary wakeup recognition according to the buffer data and returns a secondary wakeup recognition result, and if the secondary wakeup recognition result is acknowledged wakeup, determine that a final wakeup recognition result is acknowledged wakeup.

If the wakeup recognition result is suspicious wakeup and it is determined that there occurs a case of oneshot currently, the second processing unit 402 is configured to send the buffer data in the cyclic buffer queue from the interception starting position to the end of the queue to the speech recognition engine, so that the speech recognition engine performs secondary wakeup recognition according to the buffer data and returns a secondary wakeup recognition result, and if the secondary wakeup recognition result is acknowledged wakeup, determine that a final wakeup recognition result is acknowledged wakeup, the speech recognition engine performing speech recognition for content to be recognized in the buffer data.

Figure 5:
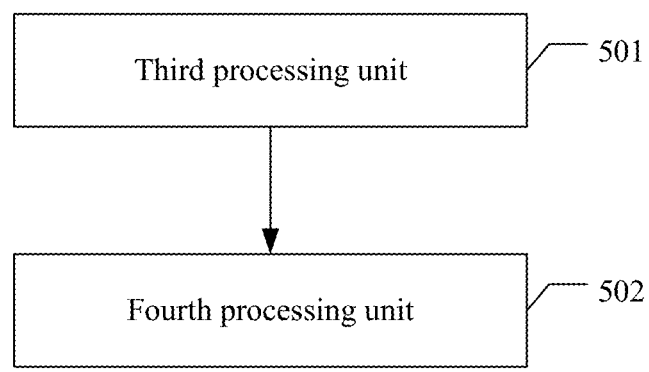
FIG. 5 is a structural schematic diagram of a second embodiment of a speech data processing apparatus according to the present disclosure.

FIG. 5 is a structural schematic diagram of a second embodiment of a speech data processing apparatus according to the present disclosure. As shown in FIG. 5, the speech data processing apparatus comprises a third processing unit 501 and a fourth processing unit 502.

The third processing unit 501 is configured to obtain the buffer data from the client, the buffer data at least including content to be recognized, the buffer data being buffer data which is in the cyclic buffer queue from the determined interception starting position to the end of the queue and is obtained after the client obtains the wakeup recognition result returned by the speech wakeup engine upon completion of the wakeup recognition and if the wakeup recognition result is acknowledged wakeup and it is determined that there occurs the case of oneshot currently, wherein the case of oneshot is a case in which the wakeup words are spoken together with the content to be recognized, the client obtaining the speech data, using the speech wakeup engine to perform wakeup recognition for the obtained speech data, and storing the obtained speech data in the cyclic buffer queue.

The fourth processing unit 502 is configured to perform speech recognition for content to be recognized in the buffer data.

The client obtains the speech data from the user, sends the speech data to the speech wakeup engine in the form of data blocks for wakeup recognition, and additionally, needs to store the speech data in the cyclic buffer queue.

After completing the wakeup recognition, the speech wakeup engine returns the wakeup recognition result, for example, acknowledged wakeup or suspicious wakeup.

While returning the wakeup recognition result, the speech wakeup engine may further return a finishing position (pos) of the wakeup words in the speech data, length information of the wakeup words, the wakeup words and the like.

The client may determine a starting position (start) of the wakeup words in the speech data according to the pos and the length information, and thereby consider the start as the interception starting position. Then, the client may obtain the buffer data in the cyclic buffer queue from the interception starting position to the end of the queue, and send the buffer data to the speech recognition engine.

Wherein the client may send the buffer data to the speech recognition engine in the manner of data blocks. In addition, the client may further send the wakeup words to the speech recognition engine.

The fourth processing unit 502 is configured to, after obtaining the buffer data and the wakeup words, filter the buffer data to obtain content to be recognized according to the wakeup words, and then perform speech recognition for the content to be recognized.

In addition, the third processing unit 501 is further configured to obtain the buffer data which is from the client and in the cyclic buffer queue from the determined interception starting position to the end of the queue when the wakeup recognition result is suspicious wakeup and there occurs a case of non-oneshot currently, and correspondingly, the fourth processing unit 502 is configured to perform secondary wakeup recognition according to the buffer data and return a secondary wakeup recognition result to the client, and if the secondary wakeup recognition result is acknowledged wakeup, determine that a final wakeup recognition result is acknowledged wakeup.

The third processing unit 501 is further configured to obtain the buffer data which is from the client and in the cyclic buffer queue from the determined interception starting position to the end of the queue when the wakeup recognition result is suspicious wakeup and there occurs a case of oneshot currently, and correspondingly, the fourth processing unit 502 is configured to perform secondary wakeup recognition according to the buffer data and return a secondary wakeup recognition result to the client, and if the secondary wakeup recognition result is acknowledged wakeup, determine that a final wakeup recognition result is acknowledged wakeup, and perform speech recognition for content to be recognized in the buffer data.

A specific workflow of the apparatus embodiments shown in FIG. 4 and FIG. 5 will not be detailed any more here, and reference may be made to corresponding depictions in the above method embodiments.

In one word, according to the solutions stated in the above apparatus embodiments, the cyclic buffer queue may be arranged to send the buffer data including complete content to be recognized to the speech recognition engine, thereby avoiding a case in the prior art that the content to be recognized is partially intercepted, and thereby improving accuracy of the speech recognition result.

Furthermore, according to the solutions stated in the above apparatus embodiments, as for suspicious wakeup, the secondary wakeup recognition operation may be performed to try to avoid leakage of real speech wakeup, thereby improving the success rate and accuracy of the speech wakeup.

Figure 6:
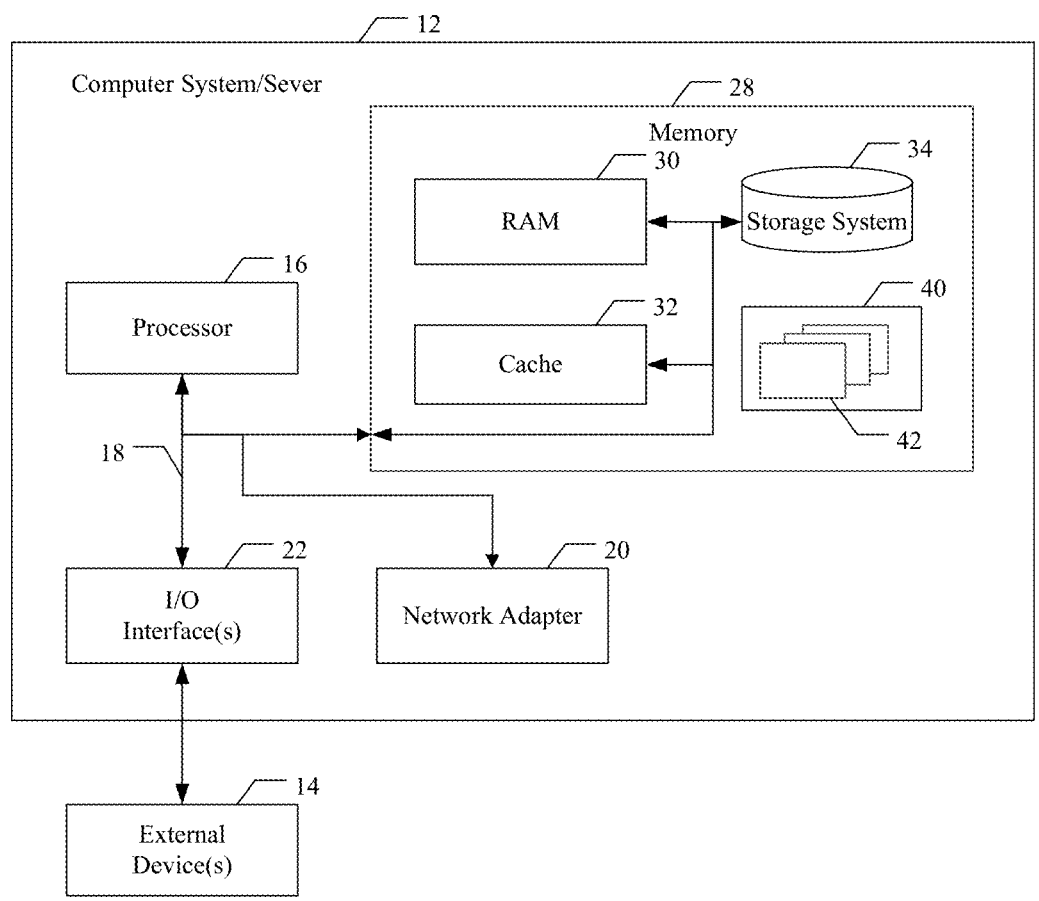
FIG. 6 is a block diagram of an exemplary computer system/server 12 adapted to implement an embodiment of the present disclosure.

FIG. 6 illustrates a block diagram of an example computer system/server 12 adapted to implement an implementation mode of the present disclosure. The computer system/server 12 shown in FIG. 6 is only an example and should not bring about any limitation to the function and scope of use of the embodiments of the present disclosure.

As shown in FIG. 6, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 6, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implements the method in embodiment shown in FIG. 1 or FIG. 3, namely, a client obtains speech data, uses a speech wakeup engine to perform wakeup recognition for the obtained speech data, and stores the obtained speech data in a cyclic buffer queue. The client obtains a wakeup recognition result returned by the speech wakeup engine upon completion of the wakeup recognition, and, if the wakeup recognition result is acknowledgment of wakeup and it is determined that currently there occurs the case of oneshot which is a case in which wakeup words are spoken together with content to be recognized, determines an interception starting position and obtains buffer data in the cyclic buffer queue from the interception staring position to an end of the queue, the buffer data at least including the content to be recognized, the client sending the buffer data to the speech recognition engine so that the speech recognition engine performs speech recognition for the content to be recognized in the buffer data.

Reference may be made to relevant depictions in the aforesaid embodiments for specific implementations, which will not be detailed any more here.

The present disclosure meanwhile discloses a computer-readable storage medium on which a computer program is stored. The program, when executed by a processor, can implement the method in the embodiment shown in FIG. 1 or FIG. 3.

Specifically, the computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A speech data processing method, wherein the method is performed by a smart device, and the speech data processing method comprises:
    obtaining speech data including wakeup word candidates, using a speech wakeup engine of the smart device to perform wakeup recognition for the obtained speech data, and storing the obtained speech data in a cyclic buffer queue;
    obtaining a wakeup recognition result returned by the speech wakeup engine upon completion of the wakeup recognition based on a preset wakeup word/phrase; and
    in response to determining that the wakeup recognition result is a suspicious wakeup, sending buffer data in the cyclic buffer queue, including the wakeup word candidates, from an interception starting position to an end of the cyclic buffer queue to a speech recognition engine outside of the smart device, and sending the preset wakeup word/phrase to the speech recognition engine, so that the speech recognition engine performs secondary wakeup recognition according to the buffer data and the preset wakeup word/phrase, and returns a secondary wakeup recognition result, and in response to determining that the secondary wakeup recognition result is an acknowledged wakeup, determining that a final wakeup recognition result is the acknowledged wakeup, and
    wherein the preset wakeup word/phrase is also configured to be used by the speech recognition engine to filter the buffer data to obtain command content to be recognized.

2. The method according to claim 1, further comprising:
    if the wakeup recognition result is the acknowledged wakeup, and it is determined that currently there occurs a case of oneshot, which is a case in which wakeup words are spoken together with the content to be recognized, determining the interception starting position and obtaining the buffer data in the cyclic buffer queue from the interception staring position to an end of the cyclic buffer queue, the buffer date at least including the content to be recognized;
    sending the buffer data to the speech recognition engine so that the speech recognition engine performs speech recognition for the content to be recognized in the buffer data.

3. The method according to claim 2, wherein the method further comprises:
    obtaining a finishing position of the wakeup words returned by the speech wakeup engine upon completion of wakeup recognition in the speech data and length information of the wakeup words;
    the determining the interception starting position comprises:
    determining a starting position of the wakeup words in the speech data according to the finishing position of the wakeup words in the speech data and the length information of the wakeup words, and considering the starting position of the wakeup words in the speech data as the interception starting position.

4. The method according to claim 3, wherein the method further comprises: if the wakeup recognition result is the suspicious wakeup and it is determined that there occurs the case of oneshot currently, the speech recognition engine performs speech recognition for the content to be recognized in the buffer data.

5. A speech data processing method, wherein the method is performed by a speech recognition engine outside of a client, and the method comprises:
    obtaining buffer data from the client, the buffer data at least including wakeup word candidates, the buffer data being buffer data which is a cyclic buffer queue from a determined interception starting position to an end of the cyclic buffer queue and is obtained after the client obtains a wakeup recognition result returned by a speech wakeup engine upon completion of the wakeup recognition based on a preset wakeup word/phrase, and determining that the wakeup recognition result is a suspicious wakeup;
    obtaining the preset wakeup word/phrase from the client;
    performing secondary wakeup recognition according to the preset wakeup word/phrase and the buffer data including the wakeup word candidates which is from the client and in the cyclic buffer queue from the interception starting position to the end of the cyclic buffer queue, and returning a secondary wakeup recognition result to the client, and in response to determining that the secondary wakeup recognition result is an acknowledged wakeup, determining that a final wakeup recognition result is the acknowledged wakeup; and
    filtering the buffer data according to the preset wakeup word/phrase to obtain command content to be recognized.

6. The method according to claim 5, further comprising:
    if the wakeup recognition result is the acknowledged wakeup, and it is determined that there occurs a case of oneshot currently, wherein the case of oneshot is a case in which wakeup words are spoken together with the content to be recognized, and the client obtains the speech data, uses the speech wakeup engine to perform wakeup recognition for the obtained speech data, and stores the obtained speech data in the cyclic buffer queue;
    performing speech recognition for the content to be recognized in the buffer data.

7. The method according to claim 6, wherein
    the interception starting position includes a starting position of the wakeup words in the speech data.

8. The method according to claim 7, wherein the method further comprises:
    if the wakeup recognition result is the suspicious wakeup and there occurs the case of oneshot currently, performing speech recognition for the content to be recognized in the buffer data.

9. A smart device, comprising:
    one or more processors;
    a memory storing instructions, which when executed by the at least one processor, cause the at least one processor to implement a speech data processing method, which comprises:
    obtaining speech data including wakeup word candidates, using a speech wakeup engine of the smart device to perform wakeup recognition for the obtained speech data, and storing the obtained speech data in a cyclic buffer queue;

obtaining a wakeup recognition result returned by the speech wakeup engine upon completion of the wakeup recognition based on a preset wakeup word/phrase; and in response to determining that the wakeup recognition result is a suspicious wakeup, sending buffer data in the cyclic buffer queue, including the wakeup word candidates, from an interception starting position to an end of the cyclic buffer queue to a speech recognition engine outside of the smart device, and sending the preset wakeup word/phrase to the speech recognition engine, so that the speech recognition engine performs secondary wakeup recognition according to the buffer data and the preset wakeup word/phrase, and returns a secondary wakeup recognition result, and in response to determining that the secondary wakeup recognition result is an acknowledged wakeup, determining that a final wakeup recognition result is the acknowledged wakeup, and wherein the preset wakeup word/phrase is also configured to be used by the speech recognition engine to filter the buffer data to obtain command content to be recognized.

10. The smart device according to claim 9, further comprising:

if the wakeup recognition result is the acknowledged wakeup, and it is determined that currently there occurs a case of oneshot, which is a case in which wakeup words are spoken together with the content to be recognized, determining an interception starting position and obtaining buffer data in the cyclic buffer queue from the interception staring position to an end of the cyclic buffer queue, the buffer data at least including the content to be recognized;

sending the buffer data to the speech recognition engine so that the speech recognition engine performs speech recognition for the content to be recognized in the buffer data.

11. The smart device according to claim 10, wherein the speech data processing method further comprises:

obtaining a finishing position of the wakeup words returned by the speech wakeup engine upon completion of wakeup recognition in the speech data and length information of the wakeup words;

the determining the interception starting position comprises:

determining a starting position of the wakeup words in the speech data according to the finishing position of the wakeup words in the speech data and the length information of the wakeup words, and considering the starting position of the wakeup words in the speech data as the interception starting position.

12. The smart device according to claim 11, wherein the speech data processing method further comprises:

if the wakeup recognition result is the suspicious wakeup and it is determined that there occurs the case of oneshot currently, the speech recognition engine performing speech recognition for the content to be recognized in the buffer data.

13. A computer device used for a speech recognition engine outside of a client, comprising:

one or more processors;

a memory storing instructions, which when executed by the at least one processor, cause the at least one processor to perform operations, the operations comprising:

obtaining buffer data from the client, the buffer data at least including wakeup word candidates, the buffer data being buffer data which is a cyclic buffer queue from a determined interception starting position to an end of the cyclic buffer queue and is obtained after the client obtains a wakeup recognition result returned by a speech wakeup engine upon completion of the wakeup recognition based on a preset wakeup word/phrase, and determining that the wakeup recognition result is a suspicious wakeup;

obtaining the preset wakeup word/phrase from the client;

performing secondary wakeup recognition according to the preset wakeup word/phrase and the buffer data including the wakeup word candidates which is from the client and in the cyclic buffer queue from the interception starting position to the end of the cyclic buffer queue, and returning a secondary wakeup recognition result to the client, and in response to determining that the secondary wakeup recognition result is an acknowledged wakeup, determining that a final wakeup recognition result is the acknowledged wakeup; and filtering the buffer data according to the preset wakeup word/phrase to obtain command content to be recognized.

14. The computer device according to claim 13, further comprising:

if the wakeup recognition result is the acknowledged wakeup, and it is determined that there occurs a case of oneshot currently, wherein the case of oneshot is a case in which wakeup words are spoken together with the content to be recognized, and the client obtains the speech data, uses the speech wakeup engine to perform wakeup recognition for the obtained speech data, and stores the obtained speech data in the cyclic buffer queue;

performing speech recognition for the content to be recognized in the buffer data.

15. The computer device according to claim 14, wherein the interception starting position includes a starting position of the wakeup words in the speech data.

16. The computer device according to claim 15, wherein the operations further comprise:

if the wakeup recognition result is the suspicious wakeup and there occurs the case of oneshot currently, performing speech recognition for the content to be recognized in the buffer data.

17. A non-transitory computer storage medium for a smart device, wherein the computer storage medium is coded with a computer program, and when the program is executed by the smart device, the smart device is enabled to implement a speech data processing method, which comprises:

obtaining speech data including wakeup word candidates, using a speech wakeup engine of the smart device to perform wakeup recognition for the obtained speech data, and storing the obtained speech data in a cyclic buffer queue;

obtaining a wakeup recognition result returned by the speech wakeup engine upon completion of the wakeup recognition based on a preset wakeup word/phrase;

and in response to determining that the wakeup recognition result is a suspicious wakeup, sending buffer data in the cyclic buffer queue, including the wakeup word candidates, from an interception starting position to an end of the cyclic buffer queue to a speech recognition engine outside of the smart device, and sending the preset wakeup word/phrase to the speech recognition engine, so that the speech recognition engine performs secondary wakeup recognition according to the buffer data and the preset wakeup word/phrase, returns a secondary wakeup recognition result, and in response to the determining that the secondary wakeup recognition result is an acknowledged wakeup, determining that a final wakeup recognition result is the acknowledged wakeup; and wherein the preset wakeup word/phrase is also configured to be used by the speech recognition engine to filter the buffer data to obtain command content to be recognized.

18. The non-transitory computer storage medium according to claim 17, further comprising:

if the wakeup recognition result is the acknowledged wakeup, and it is determined that currently there occurs a case of oneshot, which is a case in which wakeup words are spoken together with the content to be recognized, determining an interception starting position and obtaining the buffer data in the cyclic buffer queue from the interception staring position to an end of the cyclic buffer queue, the buffer data at least including the content to be recognized;

sending the buffer data to the speech recognition engine so that the speech recognition engine performs speech recognition for the content to be recognized in the buffer data.

19. The non-transitory computer storage medium according to claim 18, wherein the method further comprises:

obtaining a finishing position of the wakeup words returned by the speech wakeup engine upon completion of wakeup recognition in the speech data and length information of the wakeup words;

the determining the interception starting position comprises:

determining a starting position of the wakeup words in the speech data according to the finishing position of the wakeup words in the speech data and the length information of the wakeup words, and considering the starting position of the wakeup words in the speech data as the interception starting position.

20. The non-transitory computer storage medium according to claim 19, wherein the method further comprises:

if the wakeup recognition result is the suspicious wakeup and it is determined that there occurs the case of oneshot currently, the speech recognition engine performing speech recognition for the content to be recognized in the buffer data.

21. A non-transitory computer storage medium used for a speech recognition engine outside of a client, wherein the non-transitory computer storage medium is coded with a computer program, and when the program is executed by the speech recognition engine, the speech recognition engine is enabled to implement a speech data processing method which comprises:

obtaining buffer data from the client, the buffer data at least including wakeup word candidates, the buffer data being buffer data which is a cyclic buffer queue from a determined interception starting position to an end of the cyclic buffer queue and is obtained after the client obtains a wakeup recognition result returned by a speech wakeup engine upon completion of the wakeup recognition based on a preset wakeup word/phrase, and determining that the wakeup recognition result is a suspicious wakeup;

obtaining the preset wakeup word/phrase from the client;

performing secondary wakeup recognition according to the preset wakeup word/phrase and the buffer data including the wakeup word candidates which is from the client and in the cyclic buffer queue from the interception starting position to the end of the cyclic buffer queue, and returning a secondary wakeup recognition result to the client, and in response to determining that the secondary wakeup recognition result is an acknowledged wakeup, determining that a final wakeup recognition result is the acknowledged wakeup; and filtering the buffer data according to the preset wakeup word/phrase to obtain command content to be recognized.

22. The non-transitory computer storage medium according to claim 21, further comprising:

if the wakeup recognition result is the acknowledged wakeup, and it is determined that there occurs a case of oneshot currently, wherein the case of oneshot is a case in which wakeup words are spoken together with the content to be recognized, and the client obtains the speech data, uses the speech wakeup engine to perform wakeup recognition for the obtained speech data, and stores the obtained speech data in the cyclic buffer queue;

performing speech recognition for the content to be recognized in the buffer data.

23. The non-transitory computer storage medium according to claim 22, wherein the interception starting position includes a starting position of the wakeup words in the speech data.

24. The non-transitory computer storage medium according to claim 23, wherein the method further comprises:

if the wakeup recognition result is the suspicious wakeup and there occurs the case of oneshot currently, performing speech recognition for the content to be recognized in the buffer data.

* * * * *